F. H. VAN HOUTEN.
DOUGH HANDLING MACHINERY.
APPLICATION FILED FEB. 20, 1913.

1,119,204.   Patented Dec. 1, 1914.

Witnesses
Halbert R. Brown
M. G. Crandell

Inventor
Frank H. Van Houten
By Church & Church
his Attorneys

UNITED STATES PATENT OFFICE.

FRANK H. VAN HOUTEN, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-HANDLING MACHINERY.

1,119,204.  Specification of Letters Patent.  Patented Dec. 1, 1914.

Application filed February 20, 1913. Serial No. 749,672.

*To all whom it may concern:*

Be it known that I, FRANK H. VAN HOUTEN, a citizen of the United States, and resident of Fishkill-on-the-Hudson, in the county of Dutchess and State of New York, have invented certain new and useful Improvements in Dough-Handling Machinery; and I do hereby declare the following to be a full, clear, and exact description of the same, reference being had to the accompanying drawings, forming part of this specification, and to the figures and letters of reference marked thereon This invention relates to dough handling machinery and is particularly designed as an improvement upon apparatus heretofore used for removing the measured portions or lumps of dough delivered from a dividing or balling machine, and conveying the same to a proofing cabinet. Apparatus designed for performing this function as heretofore used has been defective in that under certain circumstances the removal of the delivered lumps or portions of dough was not sufficiently certain and quick enough to prevent adjacent or succeeding portions from contacting and coalescing and thereby causing either a complete interruption in the operation, or delivering portions of dough of impractical size.

In accordance with the present invention provision is made whereby the lumps of dough delivered from the dividing or balling machine, are each separately advanced at once to the conveying apparatus and presented thereto in a positive manner so as to prevent any lagging or retardation in the movement of the several individual lumps from any cause whatsoever.

The invention consists in certain novel details of construction and combinations and arrangements of parts, all as will be now described and pointed out particularly in the appended claims.

Figure 1:
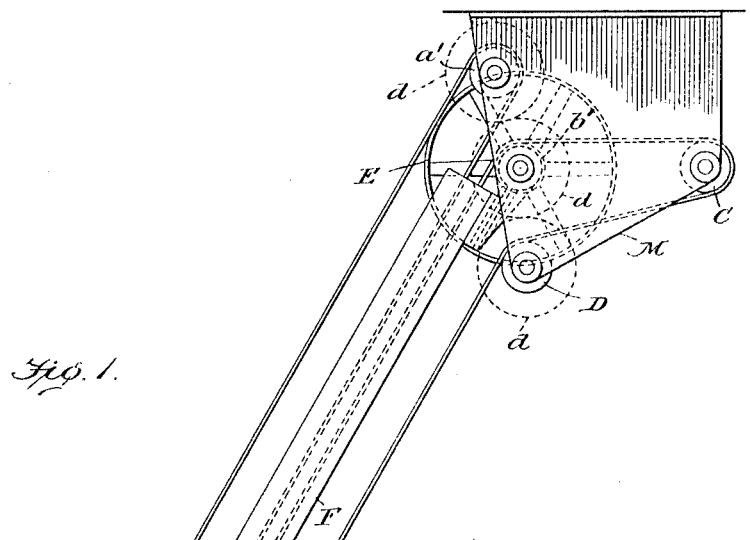
Figure 2:
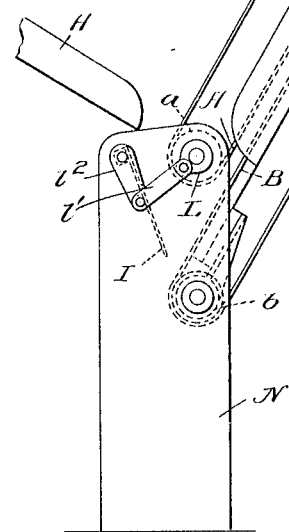
Figure 2:
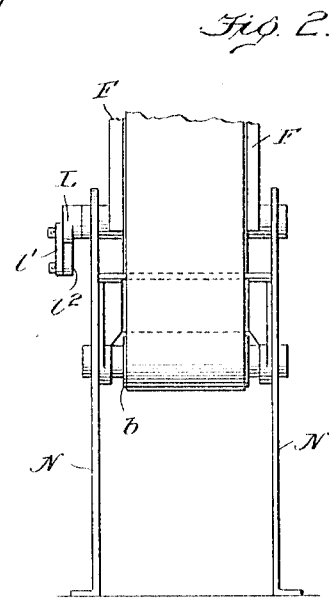

Referring to the accompanying drawings,—Figure 1 is a side elevation of an apparatus embodying the present improvements, certain of the underlying parts being shown in dotted lines, and the power mechanism omitted. Fig. 2 is a detail elevation looking at the rear side of the lower portion of the apparatus shown in Fig. 1.

Like letters of reference in both figures indicate the same parts.

The conveying apparatus, generally speaking, embodies two endless belts of canvas or other suitable material, and having parallel proximate reaches A and B, said belts being set in an inclined position and adapted to elevate the dough from the point where it is delivered from the divider or balling machine up to a point where it may pass into the proofing cabinet. Conveniently, the upper belt A passes around a roller $a$ at the lower end and around a roller $a'$ at the upper end, while the belt B passes around similar rollers $b$ at the lower and $b'$ at the upper end. The rollers $b$ and $b'$ are located at lower levels than the companion rollers $a$, $a'$ and the belt B after passing around the roller $b'$ preferably extends horizontally, or substantially horizontally, to and around a roller C, thereby forming a reach on which the dough may be advanced laterally into the proofing cabinet or into position for delivery thereto. To make the arrangement more compact, the return reach of the belt B is preferably deflected over a roller D which latter may also assist in driving the belt, as will be presently explained.

The rollers $a'$, $b'$ and D are preferably belt driving rollers and, conveniently, are connected by intermeshing gear wheels indicated by the dotted lines $d$ in Fig. 1, the shaft of one of said rollers, as, for example, the roller $b'$, being provided with a belt pulley or pulleys E receiving motion from any suitable source of power. It will be understood that the conveying apparatus operates by gripping and carrying the lumps of dough between the proximate parallel reaches of the belt, and it is preferred that these reaches of the belt shall travel through a trough-like supporting and guiding structure F, the upper end of which is supported by the shaft of the roller $d'$ or the bearings for that shaft, and the lower end by the shaft or bearings of the shaft $b$, whereby the supporting trough is kept in accurate alinement with the carrying reach of the belt B.

The measured lumps of dough are delivered from the divider or balling machine through a chute or trough H at a point where they may be moved into the bight between the conveyer belts at the entrance end. For moving the individual lumps of dough so that they will be inevitably and promptly gripped by the belts and carried away from the path of following lumps, an oscillatory feeder board I is pivotally mounted in proximity to the lower end of the belts and in a position below and outside of lumps of dough dropping from the trough H. The oscillatory feeder board is mechanically driven or oscillated at a speed sufficiently rapid to insure the pushing of each succeeding lump of dough into the bight between the belts before a following lump can come in contact therewith. The driving mechanism conveniently takes the form of a crank or eccentric L on the shaft of the roller $a$, with the connecting rod or link $l'$ extending therefrom to a crank arm $l^2$ on the shaft of the oscillatory board. With the arrangement described, the lumps of dough dropping from the trough or chute H down in front of the feeder board and into contact with the belt B, are instantly pushed up by the feeder board into the bight between the belts where they are gripped and moved off up the channel between the proximate faces of the belts. At the upper end of the apparatus the lumps of dough travel out on the horizontal reach of the belt B and are delivered from the roller C to the proofing cabinet.

Conveniently, the rollers at the upper end of the conveyer may all be journaled in a bracket support such as indicated at M, fastened in place on the ceiling of the bakery, and the rollers at the lower end may be conveniently journaled in standards N on the floor of the bakery.

Having thus described the invention, what I claim as new, and desire to secure by Letters Patent, is,—

1. A dough handling apparatus embodying endless belts having substantially parallel inclined reaches forming a passage in which the dough is gripped and carried by the belts and from which the dough is delivered at the upper end, and an oscillatory feeder board spaced from one of the belts, and movable toward and from the entrance opening between the belts at the lower end for forcing the lumps of dough into the bight between the belts at the entrance end, with means for oscillating said board, and means for feeding the lumps of dough in through the space between the board and one of the belts.

2. A dough handling apparatus embodying endless belts, having substantially parallel inclined reaches forming a passage in which the dough is gripped and carried by the belts, one of said belts extending at both ends a greater distance than the other, thereby forming at the discharge end a carrier for the dough after it is released from between the belts and at the entrance end, a receiver for the dough before it is gripped between the belts, an oscillatory feeder board spaced from the shorter belt, movable over the extended belt toward and from the entrance opening between the belts at the lower end and forming with said extension a trough-like receptacle for the dough, and means for feeding the dough through the space between the shorter belt and board.

3. In dough handling apparatus, the combination with the inclined belts having parallel proximate reaches, rollers around which said belts are guided, the guide rollers for the lower belt being located beyond the guide rollers for the upper belt at both ends, a fixed trough in which the proximate reaches of the belts travel, an oscillatory feeder board spaced from the shorter belt for forcing the dough into the bight between the belts at the entrance end, and driving mechanism intermediate said oscillatory feeder board and the guide roller for one of the belts and means for feeding the dough in through the space between the board and shorter belt.

FRANK H. VAN HOUTEN.

Witnesses:
J. E. VAN HOUTEN,
ANNA F. DEVEREAUX.